(12) United States Patent
Yumer

(10) Patent No.: US 10,339,679 B2
(45) Date of Patent: Jul. 2, 2019

(54) DYNAMIC PATH MODIFICATION AND EXTENSION

(71) Applicant: Adobe Inc., San Jose, CA (US)

(72) Inventor: Mehmet Ersin Yumer, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/055,118

(22) Filed: Feb. 26, 2016

(65) Prior Publication Data

US 2017/0249761 A1    Aug. 31, 2017

(51) Int. Cl.
| | | |
|---|---|---|
| *G06T 11/20* | (2006.01) | |
| *G06F 3/0484* | (2013.01) | |
| *G06F 3/0488* | (2013.01) | |
| *G06F 17/17* | (2006.01) | |

(52) U.S. Cl.
CPC ........ *G06T 11/203* (2013.01); *G06F 3/04845* (2013.01); *G06F 3/04883* (2013.01); *G06F 17/175* (2013.01); *G06T 11/20* (2013.01); *G06T 2200/12* (2013.01)

(58) Field of Classification Search
CPC ........ G06T 11/20; G06T 11/80; G06T 11/203; G06T 11/60; G06T 2207/20; G06T 2207/20221; G06T 13/80; G06T 2200/12; G06F 3/04845; G06F 17/17; G06F 3/04883; G06F 17/175
USPC ........ 345/418, 421, 441–443, 473, 619, 629
See application file for complete search history.

(56) References Cited

U.S. PATENT DOCUMENTS

| | | | | |
|---|---|---|---|---|
| 6,304,677 | B1 * | 10/2001 | Schuster | G06K 9/222 345/442 |
| 6,459,439 | B1 * | 10/2002 | Ahlquist, Jr. | G06T 11/203 345/619 |
| 8,669,995 | B2 | 3/2014 | Winnemoeller et al. | |
| 9,349,216 | B2 * | 5/2016 | Takayama | |
| 2005/0237325 | A1 * | 10/2005 | Motter | G06T 11/203 345/442 |
| 2005/0281467 | A1 * | 12/2005 | Stahovich | G06K 9/00416 382/202 |
| 2006/0232603 | A1 * | 10/2006 | Schuster | G06T 11/60 345/619 |

(Continued)

OTHER PUBLICATIONS

Chien, "Line Drawing Simplification by Stroke Translation and Combination", SPIE 9069, Fifth International Conference on Graphic and Image Processing, Jan. 10, 2014, 6 pages.

(Continued)

*Primary Examiner* — Chante E Harrison
(74) *Attorney, Agent, or Firm* — SBMC

(57) ABSTRACT

A digital medium environment is described to dynamically modify or extend an existing path in a user interface. An un-parameterized input is received that is originated by user interaction with a user interface to specify a path to be drawn. A parameterized path is fit as a mathematical ordering representation of the path to be drawn as specified by the un-parametrized input. A determination is made as to whether the parameterized path is to extend or modify the existing path in the user interface. The existing path is modified or extended in the user interface using the parameterized path in response to the determining that the parameterized path is to modify or extend the existing path.

19 Claims, 8 Drawing Sheets

(56) References Cited

U.S. PATENT DOCUMENTS

| | | | | |
|---|---|---|---|---|
| 2008/0024500 A1* | 1/2008 | Bae | ................... | G06T 11/203 |
| | | | | 345/442 |
| 2011/0279455 A1* | 11/2011 | McDaniel | ............... | G06T 19/20 |
| | | | | 345/427 |
| 2011/0285722 A1* | 11/2011 | Kilgard | ................ | G06T 11/203 |
| | | | | 345/442 |
| 2012/0050293 A1* | 3/2012 | Carlhian | .............. | G06T 11/203 |
| | | | | 345/442 |
| 2013/0127836 A1* | 5/2013 | Joshi | ................... | G06T 11/203 |
| | | | | 345/419 |
| 2013/0132051 A1* | 5/2013 | Hadap | ................. | G06T 11/203 |
| | | | | 703/6 |
| 2015/0067462 A1* | 3/2015 | George | ................ | G06F 17/242 |
| | | | | 715/211 |
| 2016/0351170 A1* | 12/2016 | Asente | ................. | G06T 11/203 |
| 2017/0124735 A1* | 5/2017 | Petschnigg | ........... | G06T 11/203 |
| 2017/0221253 A1* | 8/2017 | Banerjee | .............. | G06T 13/80 |
| 2017/0309045 A1* | 10/2017 | Asente | ................. | G06T 11/203 |
| 2018/0260984 A1* | 9/2018 | Severenuk | ............ | G06T 11/203 |

OTHER PUBLICATIONS

Hse,"Recognition and Beautification of Multi-Stroke Symbols in Digital Ink", Journal Computers and Graphics archive vol. 29 Issue 4, Aug. 1, 2005, 7 pages.

Liu,"Closure-aware Sketch Simplification", Journal ACM Transactions on Graphics (TOG) vol. 34 Issue 6, Nov. 2, 2015, 10 pages.

* cited by examiner

DYNAMIC PATH MODIFICATION AND EXTENSION

BACKGROUND

Path beautification techniques have been developed to increase a smoothness in paths drawn through user interaction with a user interface. Paths may be used for a variety of purposes, such as to create a drawing, specify an animation path, and so forth. Conventional path beautification techniques, however, do not conform with how users typically create paths and drawings in real world instances, such as through use of pen and paper. Consequently, these conventional path beautification techniques may not conform with a user's expectations in creating the paths.

Conventional path beautification techniques, for instance, focus on processing an entire set of raw input paths after all inputs are collected. These raw input paths are then addressed as a complex single path in order to beautify the path, such as to smooth jitters caused by manual user interaction in drawing the path. However, this departs from how a user operates in real world scenarios in which a series of typically short and sometimes repetitive paths are drawn to define a larger and more complex path. Consequently, these conventional techniques are not capable of providing real time feedback to a user as the path is drawn and are thus incapable of guiding a user in creation of subsequent paths to create a drawing. As such, conventional techniques may force the user to start over from the beginning to achieve a desired result, which may be frustrating and inefficient.

SUMMARY

Techniques and systems to modify and extend drawing paths are described. An existing path in a user interface (e.g., which may be parameterized) is extended or modified based on inputs received from a user that are not parameterized. Parameterization refers to a mathematical ordering representation of the path, such as a Bezier cure, B-spline, or other mathematical representation of a curve or series of curves. The inputs received from the user, on the other hand, may be configured as a raw set of coordinates corresponding to touch points drawn by a user's finger and detected using touchscreen functionality of a display device, a cursor control device, or other user input device such as a stylus.

In order to extend or modify the existing path, a parameterized path is first fit as a mathematical ordering representation of the path to be drawn as specified by the user inputs, e.g., as a Bezier curve, B-spline, or other mathematical representation of a curve. A determination is then made as to whether the parameterized path is to extend or modify the existing path in the user interface. The existing path in the user interface is modified using the parameterized path in response to a determination that the parameterized path is to modify the existing path. On the other hand, the existing path is extended in the user interface using the parameterized path in response to a determination that the parameterized path is to extend the existing path. This technique may be repeated to support drawing and beautification of successive paths as input by a user based on an existing path in the user interface to provide real time feedback and address how users typically create drawings.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
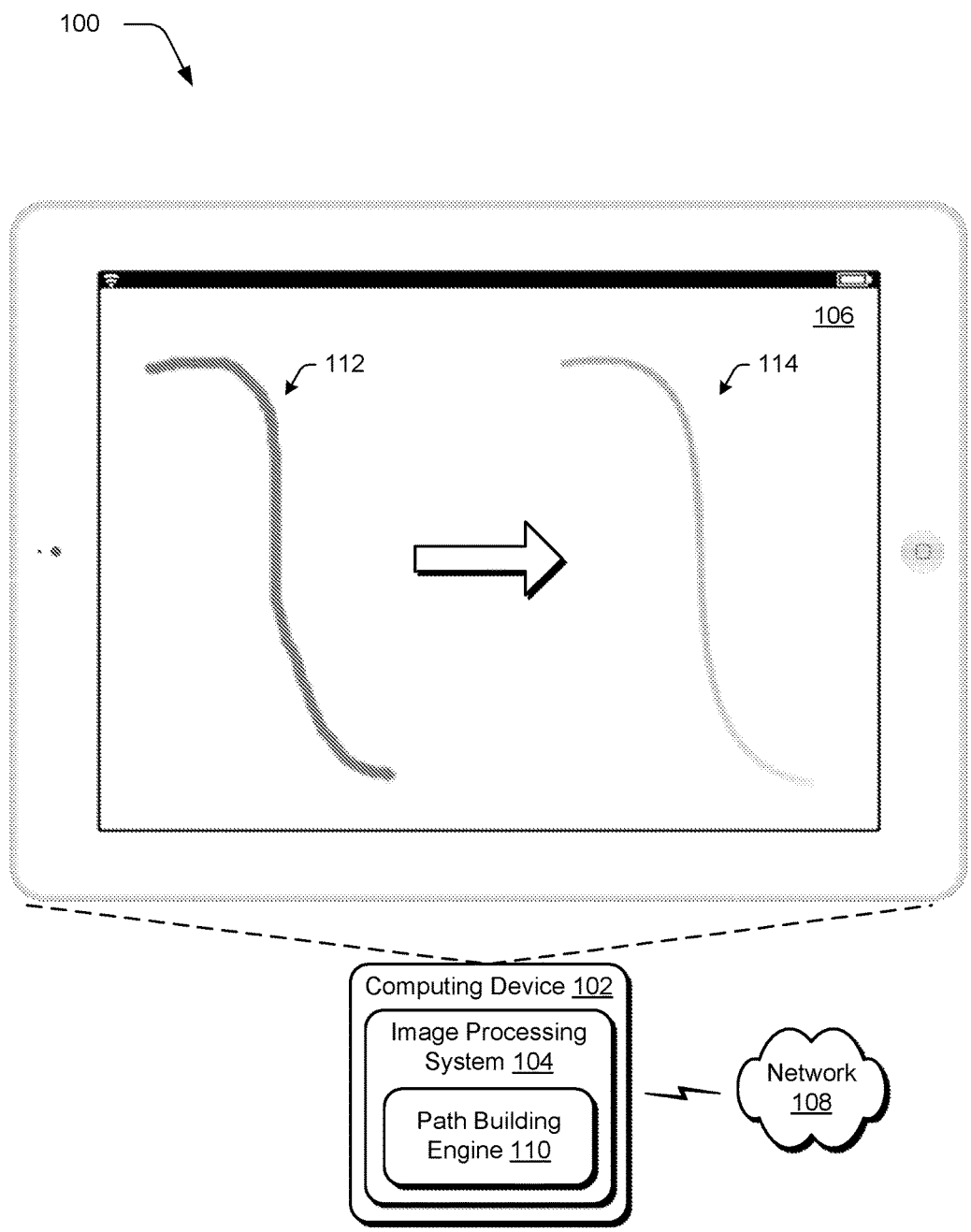
FIG. 1 is an illustration of an environment in an example implementation that is operable to employ techniques to dynamically modify and extend paths as described herein.

Techniques are described supporting dynamic modification and extension of paths in a user interface of a computing device. A path building engine is employed in the following that takes and processes an un-parameterized input originated through user interaction with a user interface to specify one or more paths to be drawn. The un-parameterized input, for instance, may be configured as a series of raw inputs that describe respective coordinates drawn through user interaction with a user interface, e.g., detected via touchscreen functionality, a cursor control device, and so forth. The path building engine is then used to build a single parameterized and beautified (e.g., aesthetically pleasing) path using this input and one or more existing paths in the user interface.

In order to do so, the path building engine may be configured as a pipeline formed as a series of modules to process the input. A first module in this pipeline includes an input rejection module used to determine whether the un-parameterized input is logically suitable to modify or extend an existing path in the user interface. Logical suitability may be determined in a variety of ways. The input rejection module, for instance, may be configured to reject un-parameterized inputs that are orthogonal to the existing path, and thus are not likely intended by a user to modify or extend the existing path. For example, a particular un-parameterized input is more likely intended by a user to start a new path, without extending or modifying the existing path, or to self-intersect an underlying path, than to continue the existing path.

In another example of logical suitability, the input rejection module may also reject un-parameterized inputs that are over a threshold distance from the existing path, and thus are not likely intended to modify or extend the existing path.

Further, the input rejection module may reject un-parameterized inputs that exhibit an amount of acceleration or velocity over a threshold amount as not logically suitable, and thus leverage a likelihood that that the user does not intend for that input to affect nearby existing paths. For example, when a user moves a stylus quickly over an existing path, there is a decreased likelihood of intending for a newly drawn path formed by the stylus to modify or extend the underlying existing path. In this way, the path building engine protects against modifications or extensions that could be caused by unintended inputs to an existing path and from further processing by the path building engine, thereby improving both accuracy and efficiency.

If the un-parameterized input is not rejected by the input rejection module, the path building engine then employs a curve fitting module as part of the pipeline. The curve fitting module is configured to fit a parameterized path as a mathematical ordering representation of the path to be drawn as specified by the un-parametrized input, i.e., to parameterize the raw inputs. The parameterized path, due to representation as a mathematical ordering, typically exhibits increased smoothness over the un-parametrized input in transitions between corresponding points along the path due to this representation. In this way, the parameterized path functions as a "beautified" version by smoothing the un-parameterized input.

The path building engine then makes a determination, through use of a curve blending module, as to whether the path input through user interaction is intended to modify or extend an existing path in the user interface. This may include determining whether to extend a "tail" of the existing path, or to modify an internal section of the existing path, e.g., by overdrawing. This determination, for instance, is made by computing two nearest neighbor graphs: one from the existing path to the path specified by the inputs (i.e., the path of the input), and another from the input path to the existing path. Based on the lowest energy links between the end points of each and corresponding nearest neighbors, the curve blending module decides whether to extend a tail of the existing path, and if so which one, or whether to modify an internal segment of the existing path by overdrawing, and if so which segment. The curve blending module of the path building engine then blends the corresponding section of the existing path with the parameterized path. For example, the paths are blended using a blending function that is at least a $C^2$ continuous blending function, to arrive at a blended path, which can be rendered by a display device of the computing device.

In accordance with the above techniques, the path building engine supports a one-at-a-time processing technique for raw inputs (e.g., strokes), and thus enables visualization and feedback from the intermediate steps to the user as these inputs are received. Thus, the path building engine avoids the limitations of conventional beautification techniques in which a result of inputs is viewable by a user only after processing the entire set of multiple inputs. Additionally, the path building engine supports local edits in which segments of an existing path may be edited (e.g., modified or extended) without editing each other segment of the path. In conventional techniques, on the other hand, iterative use in response to each new input may result in a change in appearance of the path as a whole at each step and thus may depart from a user's expectations in drawing the path. For example, in conventional techniques a user may achieve a desired result along one segment of the path, but then have that result change based on a newly added segment.

The path building engine may be configured in a variety of ways, such as a third-party module configured for inclusion in one or more applications being developed, as part of a stand-alone application, implemented as a web service, and so forth. Further discussion of these and other examples is included in the following sections. In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ dynamic path modification and extension techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 8.

The computing device 102 is illustrated as including an image processing system 104. The image processing system 104 is representative of logic implemented at least partially in hardware to create and edit images, e.g., through use of a processing system, computer-readable storage media, integrated circuits, and so on as further described in relation to FIG. 7. The image processing system 104, for instance, may process images for display in a user interface 106 of an illustrated display device of the computing device 102 for viewing by a user. Although the image processing system 104 is illustrated as being implemented by the computing device 102, functionality represented by the image processing system 104 may also be implemented in whole or in part "in the cloud" as represented by the network 108 and also further described in relation to FIG. 8.

An example of functionality usable by the image processing system 104 to create and edit images is illustrated as a path building engine 110. The path building engine 110 is representative of logic implemented at least partially in hardware (e.g., processing system, computer-readable storage media) to beautify a path drawn in the user interface 106, e.g., by smoothing. For example, the path building engine 110 may receive an input 112 specifying a path to be drawn. The input 112 is configured as a raw input formed as a series of coordinates in the user interface 106 input through user interaction. The user, for instance, may provide the inputs 112 through interaction with touchscreen functionality of a display device of the computing device 102 (e.g., drawn with a finger of the user's hand), drawn using a cursor control device (e.g., mouse), a stylus, and so forth.

Regardless of how input, the path building engine 110 is then employed to form a beautified (e.g., smoothed) version from the input 112. The path building engine 110 does so by calculating a parameterized path 114 as a mathematical ordering representation of the path to be drawn as specified by the un-parametrized input. A variety of mathematical ordering representations may be used. In one example, one or more Bezier curves are used to model smooth curves, which support scaling to different sizes. The Bezier curves are usable to represent a complex path as a series of curves through linking, one to another. In another example, a B-spline (i.e., "basis" spline) technique is used to represent the input 112 as a parameterized path 114. A spline function is a piecewise polynomial function, and each spline function of a given degree, smoothness, and domain partition can be unique represented as a linear combination of B-splines of that same degree and smoothness, and over that same partition. A variety of other mathematical representations may also be used to represent the inputs to obtain a smoothed transition between points in the input 112. As illustrated in the user interface 106, for instance, the parameterized path 114 smoothes transitions between points in the input 112 and thus removes "jitters" and "jerkiness" of the input 112 caused through manual user interaction in the drawing of the input 112, e.g., detected shaking of a user's hand. Further description of operation of the path building engine 110 is included in the following and shown in a corresponding figure.

Figure 2:
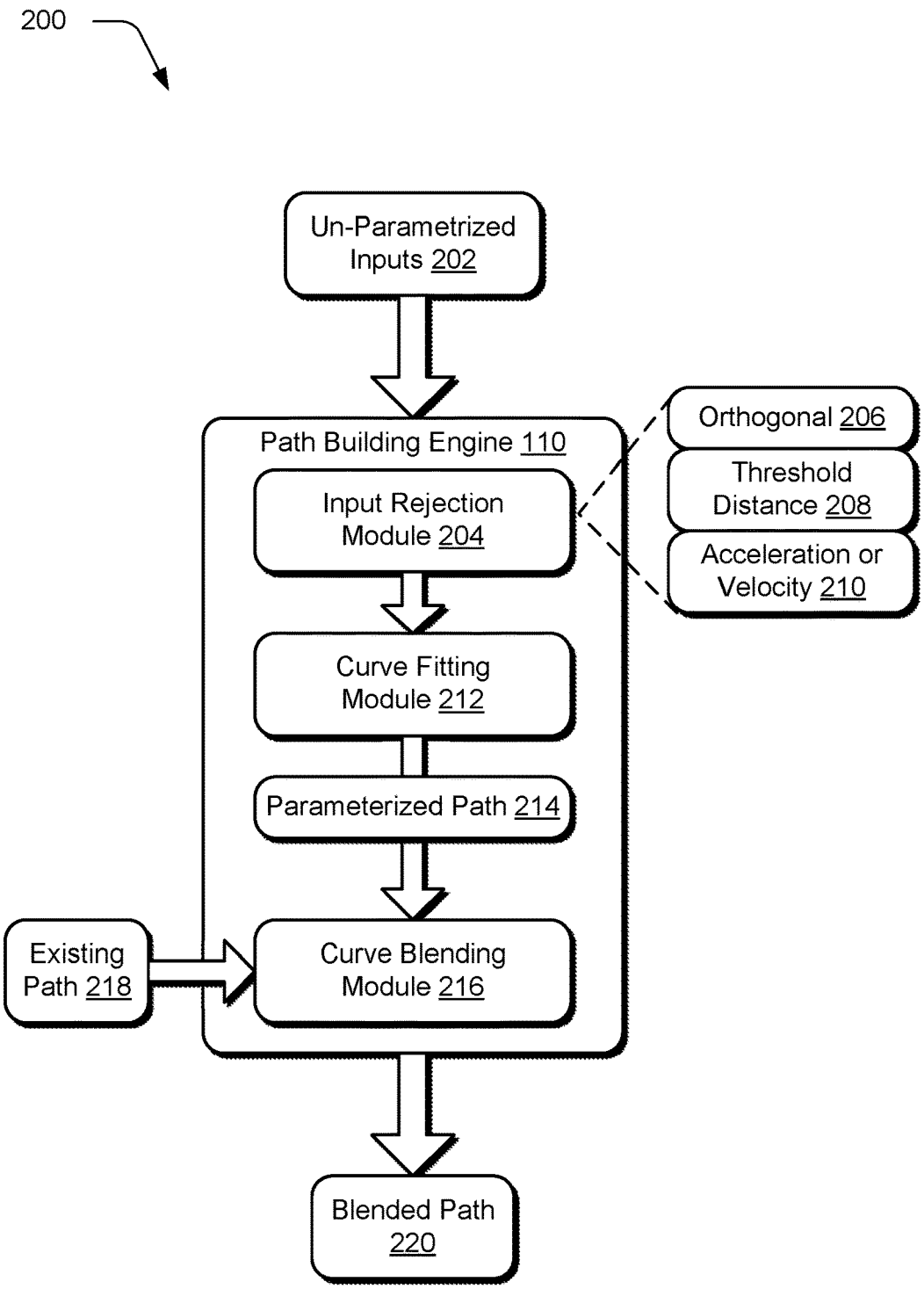
FIG. 2 depicts an example implementation showing a path building engine of FIG. 1 as implemented as a pipeline formed using a plurality of modules.

FIG. 2 depicts an example implementation 200 showing the path building engine 110 of FIG. 1 as implemented as a pipeline formed using a plurality of modules. To begin, the path building engine 110 is illustrated as receiving un-parameterized inputs 202 describing a path to be drawn in a user interface. The un-parameterized inputs 202, for instance, may be formed as a series of individual coordinates corresponding to points in a user interface 108 of FIG. 1 drawn by a user. As previously described, the inputs may originate in a variety of ways, such as detected using touchscreen functionality of a display device, use of a cursor control device or stylus, detected using a camera and without using touch as part of a natural user interface, and so forth.

The un-parameterized inputs 202 in this example are first processed by an input rejection module 204 of the path building engine 110. The input rejection module 204 is representative of logic implemented at least partially in hardware (e.g., as a processing system and computer-readable storage medium, integrated circuit, and so on as described in relation to FIG. 7) to reject inputs based on one or more factors. This rejection, for instance, is based on a determination as to a likelihood that a user intended the un-parameterized inputs 202 to modify or extend an existing path in a user interface. A variety of factors may be used as a basis of this determination, examples of which include whether a path described by the inputs is orthogonal 206 to an existing path, over a threshold distance 208 from the existing path, exhibits an amount of acceleration or velocity 210 over a threshold amount, and so forth as further described in the following.

Figure 3:
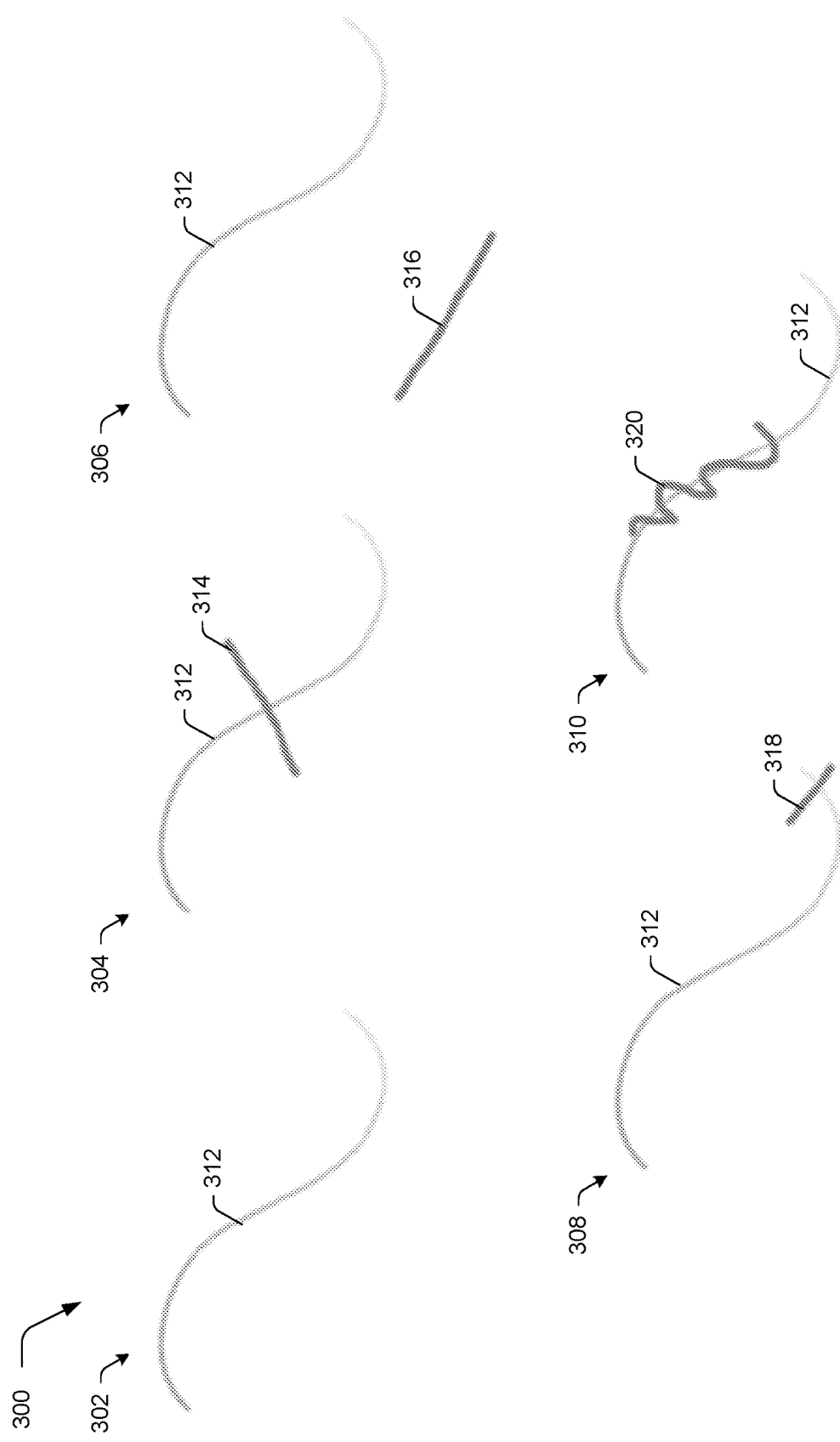
FIG. 3 depicts an example implementation of rejection of inputs by an input rejection module of FIG. 2

FIG. 3 depicts an example implementation 300 of rejection of inputs by the input rejection module 204 of FIG. 2. The example implementation 300 of FIG. 3 is illustrated using first, second, third, fourth, and fifth examples 302, 304, 306, 308, 310. In the first example 302, an existing path 312 in a user interface is shown. For example, the existing path 312 may be a parameterized version of a path previously drawn in the user interface, e.g., formed by curve fitting to raw inputs as described in greater detail in relation to the curve fitting module 212 below.

At the second example 304, an un-parameterized input of a path 314 is illustrated as drawn orthogonal 206 (e.g., generally perpendicular) at a point of a segment of the existing path 312, at which, the un-parameterized input of the path 312 intersects. The input rejection module 204, for instance, may determine that a slope of the path 314 is generally perpendicular to a slope of the segment of the existing path 312. The segment of the existing path 312 may be defined according to a predefined distance of the existing path 312 in one or more directions from the point of intersection. In response, the input rejection module 204 rejects the parameterized input of the path 314 from further processing to extend or modify the existing path 312 when generally orthogonal 206. However, other functionality may be employed to beautify the path 314, such as to form a parameterized version of the path 314 to smooth transitions in the path 314, such as to form a relatively straight line in this instance.

At the third example 306, an un-parameterized input of a path 316 is illustrated as drawn at greater than a threshold distance 208 from the existing path 312. The threshold, for instance, may be set at a static distance, set at a dynamic distance based on a length of the path 316 of the un-parameterized input such that greater lengths of the path 316 have corresponding greater threshold distances, and so forth. In the illustrated instance, the input rejection module 204 rejects the parameterized input of the path 316 from further processing to extend or modify the existing path 312 as being "to far away" to extend or modify the existing path 312. As before, other functionality may also be employed to beautify the path 316, such as to form a parameterized version of the path 316 to smooth transitions from one point to another along the path.

At the fourth example 308, an un-parameterized input of a path 318 is illustrated as drawn at greater than a threshold acceleration and/or velocity 210 and is thus rejected from further processing. The threshold, for instance, may be set at an amount indicative of a likelihood that the user does not wish the path 318 to alter the existing path 312, e.g., as a quick swipe or mark. Accordingly, in the illustrated instance, the input rejection module 204 rejects the parameterized input of the path 318 from further processing to extend or modify the existing path 312. However, other functionality may also be employed to beautify the path 318 as previously described and/or leave the path 318 "as is."

At the fifth example 310, an un-parameterized input of a path 320 is illustrated as both drawn orthogonal 206 and at greater than a threshold acceleration of velocity 210 and is thus rejected from further processing. In this instance, a user is illustrated as "crossing out" a segment of the existing path 312 and thus is not intending to modify or extend the exiting path 312 using this path 320. As before, the threshold in the acceleration or velocity may be set at an amount indicative of a likelihood that the user does not wish the path 320 to alter the existing path 312. Accordingly, in the illustrated instance, the input rejection module 204 rejects the parameterized input of the path 318 from further processing to extend or modify the existing path 312. However, other functionality may also be employed, such as to delete the underlying segment. A variety of other examples are also contemplated.

Returning again to FIG. 2, un-parameterized inputs that are not rejected by the input rejection module 204 are processed by additional modules of the path building engine 110 whereas rejected inputs are not. In this way, the path building engine 110 is configured to conserve processing resources. Other examples are also contemplated, such as to permit beautification of the paths through curve fitting as described above.

The curve fitting module 212 in this example receives the un-parameterized inputs 202. The curve fitting module 212 is representative of logic implemented at least partially in hardware (e.g., as a processing system and computer-readable storage medium, integrated circuit, and so on as described in relation to FIG. 7) to form a parameterized path 214 as a mathematical ordering representation of the path to be drawn as specified by the un-parametrized input 202. As previously described, a parameterized path 214 may employ one or more equations to describe a path to be formed that permits scaling.

The parameterized path 214, due to representation as a mathematical ordering, typically exhibits increased smoothness over the un-parametrized input 202 in transitions between corresponding points along the path due to this representation. In this way, the parameterized path 214 functions as a "beautified" version by smoothing the un-parameterized inputs 202. A variety of mathematical ordering representations may be used. In one example, one or more Bezier curves are used to model smooth curves, which support scaling to different sizes. The Bezier curves are usable to represent a complex path as a series of curves through linking, one to another. In another example, B-spline (i.e., "basis" spline) is used to represent the un-parameterized inputs 202 as a parameterized path 214. A spline function is a piecewise polynomial function, and each spline function of a given degree, smoothness, and domain partition can be unique represented as a linear combination of B-splines of that same degree and smoothness, and over that same partition. A variety of other mathematical representations may also be used.

The parameterized path 214 is then provided to a curve blending module 216. The curve blending module 216 is representative of logic implemented at least partially in hardware (e.g., as a processing system and computer-readable storage medium, integrated circuit, and so on as described in relation to FIG. 7) to modify of extend an existing path 218 in the user interface using the parameterized path 214.

The curve blending module 216, for instance, may first make a determination as to a likelihood that the parameterized path 214 is to modify the existing path 218 or extend the existing path 218. For example, the curve blending module 216 may determine a likelihood as to whether the parameterized path 216 is to extend a tail of the existing path 218 or modify an internal segment of the existing path 218, e.g., through overdrawing.

To do so, the curve blending module 216 first computes two nearest neighbor graphs. The first of the nearest neighbor graphs describes distances between points along the existing path 218 and the parameterized path 214. The second of the nearest neighbor graphs describes distances between points along the parameterized path 214 to the existing path 218. Based on lowest energy links between end points of the parameterized path 214 and the existing path 218 and corresponding nearest neighbors, the curve blending module 216 determines whether extend an end point (i.e., tail) of the exiting path 218, and if so which one, or to modify an internal segment of the existing path 218 by overdrawing, and if so, which segment.

The nearest neighbor graphs, for instance, may indicate that an endpoint of the parameterized path 214 is closest to an endpoint of the exiting path 218, and in response, the curve blending module 216 uses the parameterized path 214 to extend the existing path 218 at that endpoint. In another instance, the nearest neighbor graphs indicate the parametrized path 214 is closest to a segment of the existing path 218 (e.g., within a threshold distance) and the curve blending module 216 modifies that segment using the existing path 218, e.g., by overdrawing.

Modifications and extensions may be made in a variety of ways to the existing path 218 based on the parameterized path 214. In one example, a blending technique is used in which the existing and parameterized paths 214, 218 are blended together using a blending function (e.g., a $C^2$ continuous blending function) to achieve a blended path 220 based on both of these paths. In another example, the parameterized path 214 is used to replace a segment of the existing path 218 (e.g., through overdrawing) and blended with other segments of the existing path 218 to form the blended path 220. A variety of other blending examples are also contemplated.

The blended path 220 is then rendered in the user interface 108 of the computing device 102. This process may continue (e.g., iterate) for successive un-parameterized inputs 202 to follow a natural user flow in creation of a drawing through successive inputs. Further, these techniques may support local editing through modification as described above and as such may be performed without affecting an entirety of the existing path 218 as a whole, which was typically encountered in conventional techniques as described above.

Figure 4:
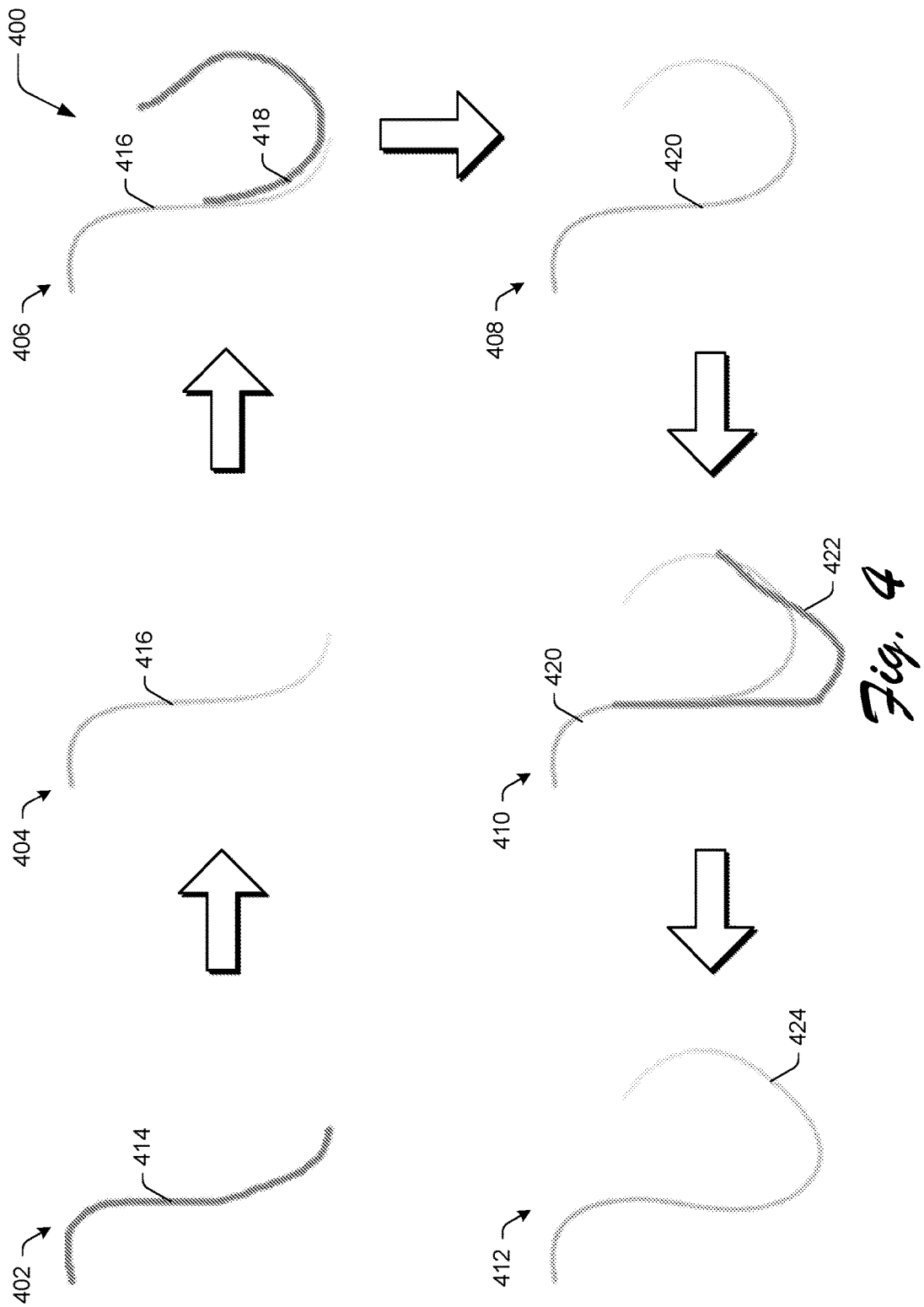
FIG. 4 depicts an example implementation of extension and modification of a path in a user interface of FIG. 1.

FIG. 4 depicts an example implementation 400 of extension and modification of a path in a user interface 108 of FIG. 1. This example implementation 400 is illustrated using first, second, third, fourth, fifth, and sixth stages 402, 404, 406, 408, 410, 412. At the first stage 402, inputs specifying a path as an un-parametrized (i.e., raw) input 414 are received. In response, the path building engine 110 smoothes and beautifies the un-parameterized input 414 to form a parameterized input 416 as shown at the second stage 404, which now functions as an existing path in the user interface 108 of FIG. 1.

At the third stage 406, un-parametrized inputs 418 are again received specifying a path. The path building engine 110 first determines whether the parametrized inputs 418 are logically suitable to modify or extend the existing path (e.g., path 416) as before. Because the un-parameterized inputs 418 are suitable, the path building engine 110 first parameterizes the un-parameterized inputs 418 and then determines that these parameterized inputs are likely intended to extend the existing path, e.g., path 416. Accordingly, the existing path (e.g., path 416) and the newly parameterized path are then blended by the path building engine 110 as an extension to form path 420, which is then rendered as an existing path in the user interface as shown at the fourth stage 408.

At the fifth stage 410, un-parametrized inputs 422 are again received specifying a path. The path building engine 110 first determines whether the parametrized inputs 422 are logically suitable to modify or extend the existing path (e.g., path 416) as before. Because the un-parametrized inputs 422 are suitable to modify path 420, the path building engine 110 first parameterizes the un-parametrized inputs 422 and then determines that these parameterized inputs are likely intended to modify a segment of the existing path, e.g., path 420. Accordingly, the existing path (e.g., path 420) and the newly parameterized path are then blended by the path building engine 110 as a modification to an internal segment to form path 424, which is then rendered as an existing path in the user interface as shown at the fourth stage 412. In this way, a user may intuitively form complex paths in a manner consistent with how the user typically creates a drawing in real life using pen and paper.

Figure 5:
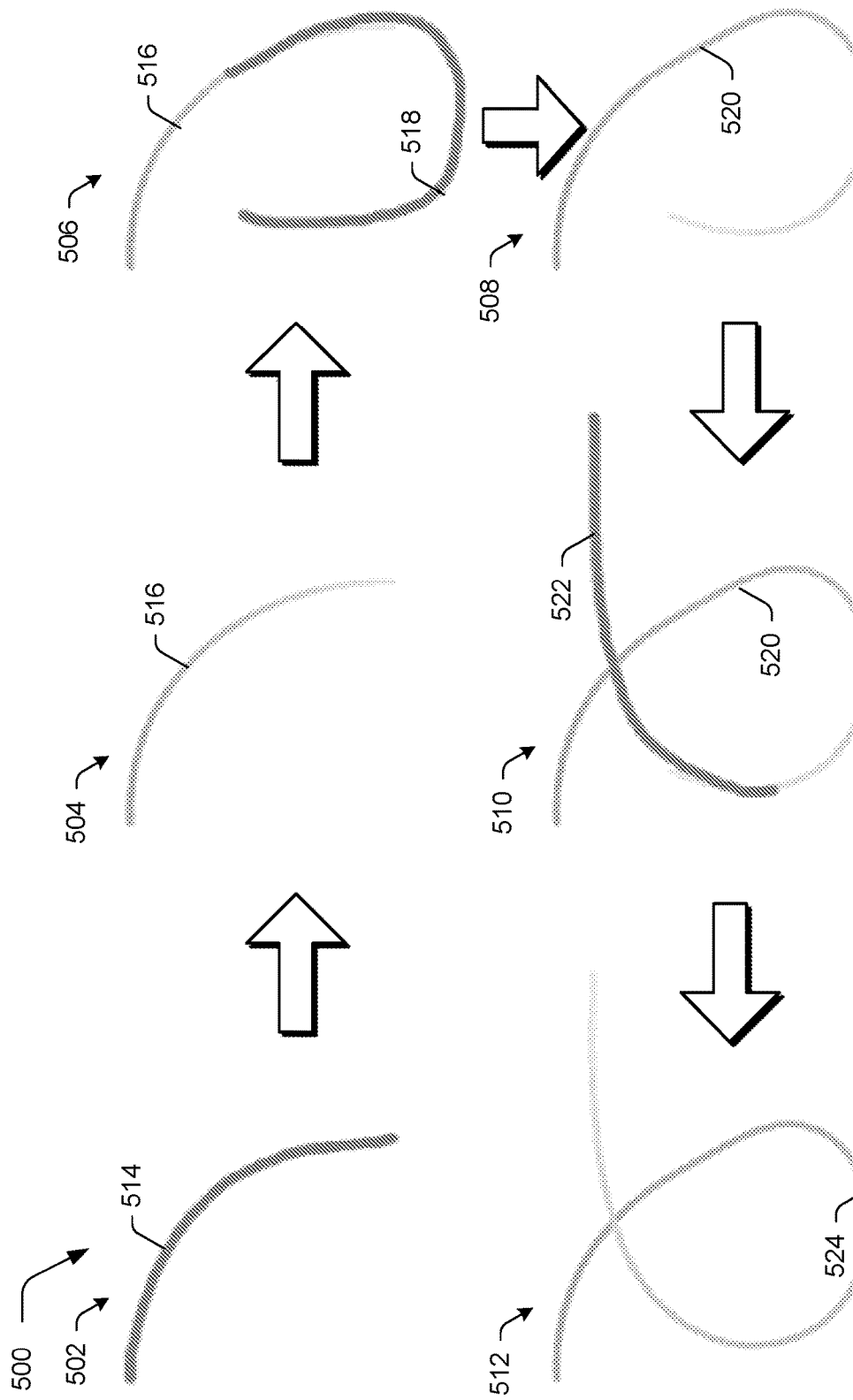
FIG. 5 depicts another example implementation of extension and modification of a path in a user interface of FIG. 1.

FIG. 5 depicts an example implementation 500 of extension of a self-intersecting path in a user interface 108 of FIG.

1. This example implementation 500 is illustrated using first, second, third, fourth, fifth, and sixth stages 502, 504, 506, 508, 510, 512. At the first stage 502, inputs specifying a path as an un-parametrized (i.e., raw) input 514 are received. In response, the path building engine 110 smoothes and beautifies the un-parametrized input 514 to form a parameterized input 516, which now functions as an existing path in the user interface 108 of FIG. 1.

At the third stage 506, un-parametrized inputs 418 are again received specifying a path. The path building engine 110 again determines whether the parametrized inputs 518 are logically suitable to modify or extend the existing path (e.g., path 516) as before. Because the un-parametrized inputs 518 are suitable, the path building engine 110 first parameterizes the un-parametrized inputs 518 and then determines that these parameterized inputs are likely intended to extend the existing path, e.g., path 516. Accordingly, the existing path (e.g., path 516) and the newly parameterized path are then blended by the path building engine 110 as an extension to form path 520, which is then rendered as an existing path in the user interface as shown at the fourth stage 408.

At the fifth stage 510, un-parametrized inputs 522 are again received specifying a path. The path building engine 110 first determines whether the parametrized inputs 522 are logically suitable to modify or extend the existing path as before. In this instance, there are two existing paths, one over which the inputs 522 are drawn and another in which the inputs are to extend. The inputs 522 in this instance are determined are not be suitable to modify the underlying path, e.g., by being orthogonal, and thus are not used to affect that segment of the path. However, the un-parametrized inputs 422 are suitable to extend path 420. Accordingly, the path building engine 110 first parameterizes the un-parametrized inputs 522 and then determines that these parameterized inputs are likely intended to extend the existing path 520. Accordingly, the existing path (e.g., path 520) and the newly parameterized path are then blended by the path building engine 110 as an extension to form path 524, which is then rendered an existing path in the user interface as shown at the sixth stage 512. In this way, a user may intuitively form complex paths in a manner consistent with how the user typically creates a drawing in real life using pen and paper, even when those paths intersect other paths, which was not possible using conventional techniques.

Figure 6:
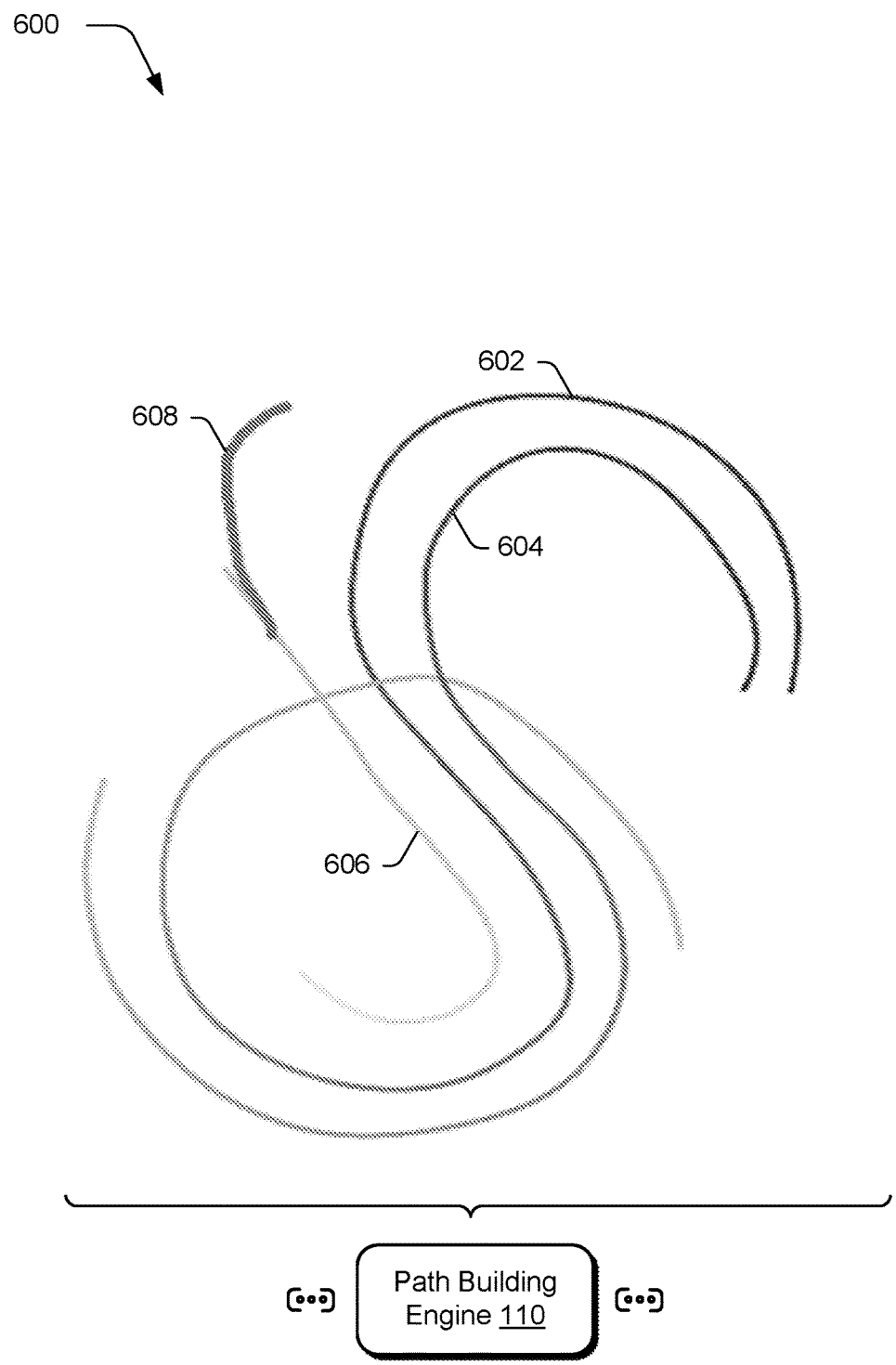
FIG. 6 depicts another example implementation of extension and modification of a path in a user interface of FIG. 1.

FIG. 6 depicts a system 600 in an example implementation in which a plurality of instances of the path building engine 110 are executed. Independent instances of the path building engine 110 may be run for different paths 602, 604, 606 in the user interface that are disconnected in this example. In this way, an input 608 may be determined to modify or extend an independent one of these instances, thereby permitting a user to edit many independent and complex paths in the same environment to support complex drawings.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
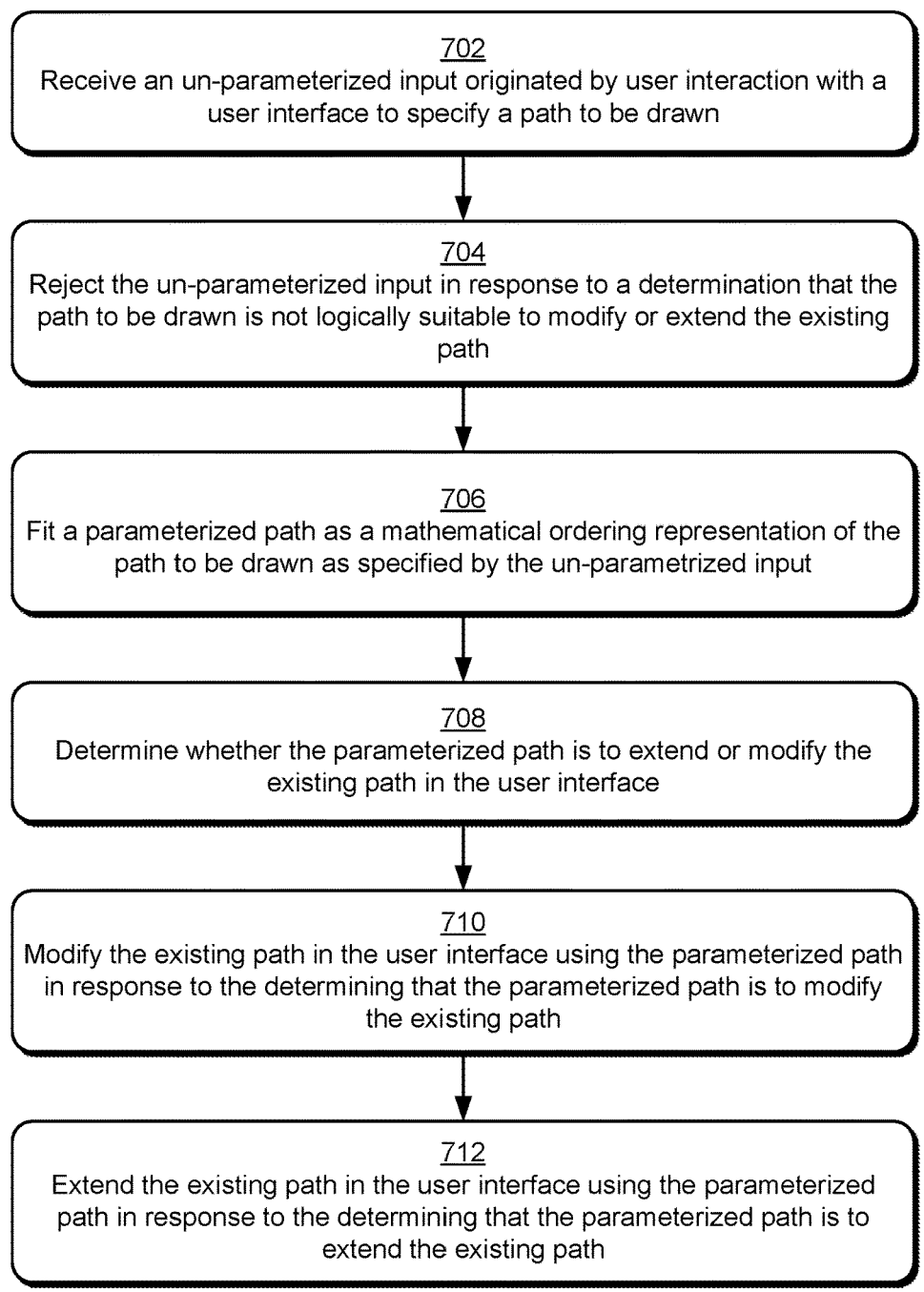
FIG. 7 is a flow diagram depicting a procedure in an example implementation in which an existing path in a user interface is extended or modified based on inputs received from a user that are not parameterized.

FIG. 7 depicts a procedure 700 in an example implementation in which an existing path in a user interface is extended or modified based on inputs received from a user that are not parameterized. An un-parameterized input is received that is originated by user interaction with a user interface to specify a path to be drawn (block 702). The inputs received from the user, for instance, may be configured as a raw set of coordinates corresponding to touch points drawn by a user's finger and detected using touchscreen functionality of a display device, a cursor control device, or other user input device such as a stylus.

A determination is then made as whether to reject the un-parameterized input based on whether the path to be drawn by the input is logically suitable to modify or extend the existing path (block 704) based on a relationship (e.g., spatial, orientation) of the path to the existing path. The determination, for instance, may be based on whether the input path is orthogonal 207, beyond a threshold distance 208, or over a threshold acceleration of velocity 210 as described above.

If not rejected, a parameterized path is first fit as a mathematical ordering representation of the path to be drawn as specified by the user inputs (block 706). Parameterization refers to a mathematical ordering representation of the path, such as a Bezier cure, B-spline, or other mathematical representation of a curve or series of curves A determination is then made as to whether the parameterized path is to extend or modify the existing path in the user interface (block 708). This may be performed using nearest neighbor graphs as described above in relation to operation of the curve blending module 217 of FIG. 2. The existing path in the user interface is modified using the parameterized path in response to a determination that the parameterized path is to modify the existing path (block 710), e.g., a tail of the existing path corresponds to a tail of the parameterized path.

On the other hand, the existing path is extended in the user interface using the parameterized path in response to a determination that the parameterized path is to extend the existing path (block 712). A segment of the existing path, for instance, may be overdrawn using the parameterized path as shown in FIG. 5. These blended paths are then rendered for viewing in a user interface by the computing device 102. This technique may be repeated to support drawing and beautification of successive paths as input by a user based on an existing path in the user interface to provide real time feedback and address how users typically create drawings.

Example System and Device

Figure 8:
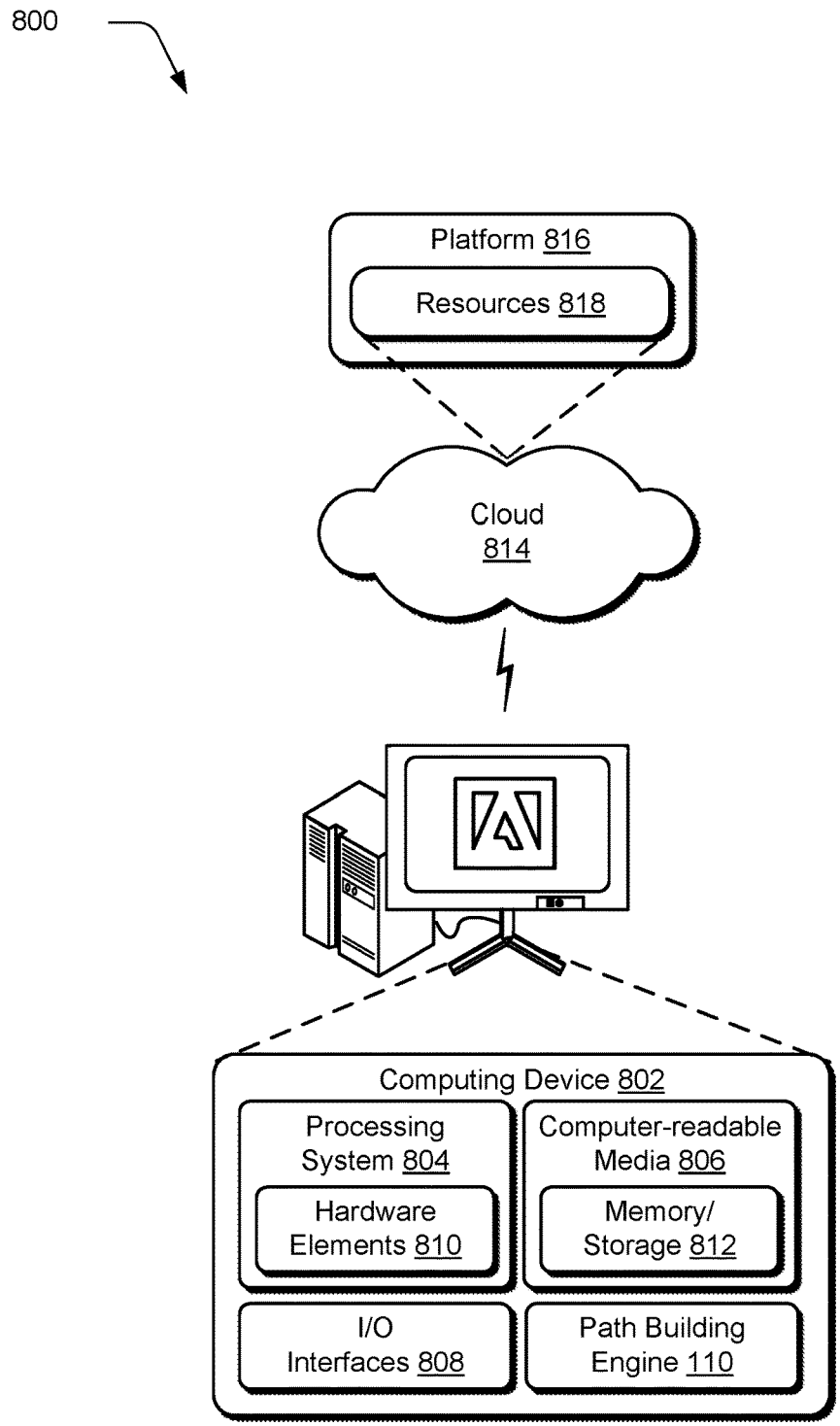
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the path building engine 110. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules, e.g., at least partially in hardware using a processing system and computer-readable storage medium, integrated circuit, and so on. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to dynamically modify an existing path in a user interface, a method implemented by a computing device, the method comprising:
   receiving, by the computing device, an un-parameterized input originated by user interaction with a user interface to specify a path to be drawn;
   fitting, by the computing device, a parameterized path as a mathematical ordering representation of the path;
   determining, by the computing device, the parameterized path is logically suitable to modify an internal segment of the existing path, the determining based on detecting acceleration of the un-parameterized input as less than a threshold amount; and
   modifying, by the computing device, the internal segment of the existing path in the user interface by blending the internal segment with the parameterized path in response to the determining that the parameterized path is to modify the existing path.

2. The method as described in claim 1, further comprising:
   determining, by the computing device, the path to be drawn is not logically suitable to modify the existing path; and
   rejecting, by the computing device, the un-parameterized input for processing as part of the fitting.

3. The method as described in claim 2, wherein the determining includes determining the path to be drawn is orthogonal to the existing path.

4. The method as described in claim 2, wherein the determining includes determining the path to be drawn is over a threshold distance from the existing path.

5. The method as described in claim 4, wherein the threshold distance is defined based on a length of the path to be drawn.

6. The method as described in claim 1, wherein the parameterized path is configured as at least one Bezier curve or B-spline.

7. The method as described in claim 1, wherein the modifying includes blending the existing path with the parameterized path.

8. The method as described in claim 1, wherein the existing path is parameterized.

9. In a digital medium environment to dynamically modify or extend an existing path in a user interface, a system to implement a path building engine, the system comprising:
   an input rejection module implemented at least partially in hardware to reject an un-parameterized input from further processing in response to a determination that a path to be drawn is not logically suitable to modify or extend the existing path in a user interface;
   a curve fitting module implemented at least partially in hardware to process the un-parameterized input received from the input rejection module in response to the determination that the path to be drawn is logically suitable to modify or extend the existing path, the processing including fitting a parameterized path as a mathematical ordering representation of the path to be drawn as specified by the un-parametrized input; and
   a curve blending module implemented at least partially in hardware to modify or extend the existing path in the user interface using the parameterized path based on:
   a first nearest neighbor graph that describes distances between points along the existing path and the parameterized path; and
   a second nearest neighbor graph that describes distances between points along the parameterized path to the existing path.

10. The system as described in claim 9, wherein the curve blending module is implemented at least partially in hardware to modify the existing path in the user interface using the parameterized path in response to a determination that the parameterized path is to modify the existing path.

11. The system as described in claim 9, wherein the input rejection module is configured to reject the un-parametrized input from being processed by the curve fitting module in response to determining the path to be drawn is orthogonal to the existing path.

12. The system as described in claim 9, wherein the input rejection module is configured to reject the un-parametrized input from being processed by the curve fitting module in response to determining the path to be drawn is over a threshold distance from the existing path.

13. The system as described in claim 9, wherein the input rejection module is configured to reject the un-parametrized input from being processed by the curve fitting module in response to detecting acceleration of the un-parameterized input over a threshold amount.

14. The system as described in claim 9, wherein the curve blending module is configured to blend the existing path with the parameterized path.

15. One or more computer-readable storage media comprising instructions stored thereon that, responsive to execution by a computing device, causes the computing device to implement a path building engine configured to perform operations comprising:
  receiving an un-parameterized input originated by user interaction with a user interface to specify a path to be drawn;
  determining acceleration of the un-parameterized input is below a threshold amount;
  determining the path to be drawn is logically suitable to modify or extend an existing path in a user interface;
  responsive to the determining the acceleration of the un-parameterized input is below the threshold amount and the determining the path to be drawn is logically suitable to modify or extend the existing path, fitting a parameterized path as a mathematical ordering representation of the path to be drawn as specified by the un-parametrized input; and
  modifying the existing path in the user interface using the parameterized path in response to determining that the parameterized path is to modify the existing path.

16. One or more computer-readable storage media as described in claim 15, further comprising determining that the path to be drawn is not logically suitable to modify the existing path in the user interface based on a relationship of the path to the existing path; and rejecting the un-parameterized input from processing as part of the fitting.

17. One or more computer-readable storage media as described in claim 16, wherein the determining includes determining the path to be drawn is orthogonal to the existing path.

18. One or more computer-readable storage media as described in claim 16, wherein the determining includes determining the path to be drawn is over a threshold distance from the existing path.

19. One or more computer-readable storage media as described in claim 16, wherein the determining includes determining acceleration of the un-parameterized input is over the threshold amount; and rejecting the un-parameterized input from processing as part of the fitting.

* * * * *